(12) United States Patent
Fujiyama et al.

(10) Patent No.: US 8,101,132 B2
(45) Date of Patent: Jan. 24, 2012

(54) MIXING APPARATUS

(75) Inventors: Yuichiro Fujiyama, Yokohama (JP);
Toshiaki Okuhara, Yokohama (JP);
Shigeko Okuhara, legal representative,
Fujisawa (JP)

(73) Assignees: Japan Cooperation Center, Petroleum,
Tokyo (JP); Nippon Oil Corporation,
Tokyo (JP)

( * ) Notice: Subject to any disclaimer, the term of this patent is extended or adjusted under 35 U.S.C. 154(b) by 298 days.

(21) Appl. No.: 12/373,103

(22) PCT Filed: Jul. 10, 2007

(86) PCT No.: PCT/JP2007/063716
§ 371 (c)(1),
(2), (4) Date: Jun. 3, 2009

(87) PCT Pub. No.: WO2008/007658
PCT Pub. Date: Jan. 17, 2008

(65) Prior Publication Data
US 2010/0150797 A1   Jun. 17, 2010

(30) Foreign Application Priority Data
Jul. 12, 2006 (JP) .................. 2006-192142

(51) Int. Cl.
*B01J 8/08* (2006.01)
*B01F 15/00* (2006.01)

(52) U.S. Cl. ...... 422/214; 422/213; 422/216; 366/173.2

(58) Field of Classification Search .................. 422/213, 422/214, 216; 366/173.2
See application file for complete search history.

(56) References Cited

U.S. PATENT DOCUMENTS
6,186,658 B1 * 2/2001 Nishida et al. ............. 366/173.2

FOREIGN PATENT DOCUMENTS
| CN | 1208668 | 2/1999 |
| JP | 10-249178 | 9/1998 |

OTHER PUBLICATIONS

"Development of HS-FCC (High-Severity Fluid Catalytic Cracking) Technology," Nisseki Mitsubishi Technical Review 2000, vol. 42, No. 2, pp. 6-12 (2000).

* cited by examiner

*Primary Examiner* — Walter D Griffin
*Assistant Examiner* — Lassanework Seifu
(74) *Attorney, Agent, or Firm* — Finnegan, Henderson, Farabow, Garrett & Dunner, LLP

(57) ABSTRACT

To provide a mixing device capable of effectively mixing stock oil with a catalyst, while increasing the amount of throughput, the relations of $8.0 \geqq Q \times (W/D)/(u1+u2)$, $Q=300$ to 2000 $[kg/m^2 s]$, $W/D=0.2$ to 0.5, $u1=5$ to 300 $[m/s]$, and $u2=5$ to 300 $[m/s]$ are satisfied when a mass flow per unit area of a moving bed is Q [kg/nes], the difference between an outer diameter and an inner diameter of the moving bed is W [m], an inner diameter of a reaction tube is D [m], a linear velocity of a horizontal component of the stock oil at a jet orifice of the internal stock oil injection nozzle u1 [m/s], and a linear velocity of a horizontal component of the stock oil at a jet orifice of the external stock oil injection nozzle u2 [m/s].

4 Claims, 6 Drawing Sheets

MIXING APPARATUS

CROSS-REFERENCE TO RELATED APPLICATIONS

This application is a national phase application of International Application No. PCT/JP2007/063716, filed Jul. 10, 2007, and claims the priority of Japanese Application No. 2006-192142, filed Jul. 12, 2006, the contents of both of which are incorporated herein by reference.

TECHNICAL FIELD

The present invention relates to a mixing device for mixing stock oil with a particulate catalyst.

BACKGROUND ART

There has been conventionally known a mixing device that has a moving bed forming unit for forming a cylindrical moving bed by continuously dropping a particulate catalyst from the top to the bottom while distributing the particulate catalyst in an annular form, an internal stock oil supply part for supplying stock oil over the entire area in a circumferential direction of an inner circumferential surface of the moving bed formed by the moving bed forming unit, and an external stock oil supply part for supplying the stock oil over the entire area in a circumferential direction of an outer circumferential surface of the moving bed formed by the moving bed forming unit (see, for example, Patent Literature 1). In this mixing device, because the moving bed forming unit forms a catalyst into the cylindrical moving bed, the contact area between the stock oil and the catalyst increases, whereby the stock oil and the catalyst can be mixed promptly and evenly.
Patent Literature 1: Japanese Patent Application Publication 10-249178

DISCLOSURE OF THE INVENTION

Problem to be Solved by the Invention

However, enlarging the mixing device to increase the amount of throughput of the mixing device increases the difference (thickness) between the inner diameter and the outer diameter of the cylindrical moving bed formed by the moving bed forming unit. Therefore, in order to mix the stock oil with the catalyst promptly and evenly while increasing the amount of throughput of the mixing device, the stock oil and the catalyst need to be mixed in accordance with the thickness of the moving bed.

An object of the present invention, therefore, is to provide a mixing device capable of effectively mixing stock oil with a catalyst promptly and evenly, while increasing the amount of throughput.

Means for Solving the Problem

The mixing device according to the present invention is a mixing device for mixing stock oil with a particulate catalyst, having: a moving bed forming unit that forms a cylindrical moving bed by continuously dropping the catalyst from the top to the bottom while distributing the catalyst in an annular form; a reaction tube that surrounds the moving bed formed by the moving bed forming unit; an internal stock oil supply part that has an internal stock oil injection nozzle for supplying the stock oil over the entire area in a circumferential direction of an inner surface of the moving bed formed by the moving bed forming unit; and an external stock oil supply part having an external stock oil injection nozzle for supplying the stock oil over the entire area in a circumferential direction of an outer surface of the moving bed formed by the moving bed forming device, wherein when a mass flow per unit area of the moving bed is Q [kg/m$^2$s], the difference between an outer diameter and an inner diameter of the moving bed W [m], an inner diameter of the reaction tube D [m], a linear velocity of a horizontal component of the stock oil at a jet orifice of the internal stock oil injection nozzle u1 [m/s], the stock oil being supplied from the internal stock oil supply part, and a linear velocity of a horizontal component of the stock oil at a jet orifice of the external stock oil injection nozzle u2 [m/s], the stock oil being supplied from the external stock oil supply part, $$8.0 \geq Q \times (W/D)/(u1+u2),$$

Q=300 to 2000 [kg/m$^2$s],
W/D=0.2 to 0.5,
u1=5 to 300 [m/s], and
u2=5 to 300 [m/s] are satisfied.

In the mixing device according to the present invention, when the mass flow per unit area of the moving bed is Q [kg/m$^2$s], the difference between the outer diameter and the inner diameter of the moving bed W [m], the inner diameter of the reaction tube D [m], the linear velocity of the horizontal component of the stock oil at the jet orifice of the internal stock oil injection nozzle u1 [m/s], the stock oil being supplied from the internal stock oil supply part, and the linear velocity of the horizontal component of the stock oil at the jet orifice of the external stock oil injection nozzle u2 [m/s], the stock oil being supplied from the external stock oil supply part, all of the above-described relational expressions are satisfied, in which state the stock oil is injected from the internal stock oil injection nozzle and the external stock oil injection nozzle to the moving bed. Therefore, the stock oil and the catalyst can be mixed promptly and evenly in an effective manner while increasing the amount of throughput of the mixing device.

In addition, the internal stock oil injection nozzle and the external stock oil injection nozzle preferably inject the stock oil downward at 15° to 75° relative to a horizontal surface of each nozzle. As a result, when the stock oil injected from the internal stock oil injection nozzle and the external stock oil injection nozzle collies with the moving bed, the stock oil can be refined by the shock from the collision. Therefore, the stock oil and the catalyst can be mixed more effectively.

It is also preferred that the temperature of the catalyst be at least 300° C. and the internal stock oil supply part and the external stock oil supply part be each provided with heat insulating means for insulating heat generated from the catalyst. Accordingly, caulking of the stock oil caused by the heat conduction from the catalyst can be prevented.

Moreover, it is preferred that the inside of the moving bed forming unit be provided with a plurality of baffle plates for evenly dispersing the catalyst in a horizontal direction while changing the direction of the catalyst that is continuously dropped from the top to the bottom. Accordingly, the catalyst is dispersed evenly in a horizontal direction, while changing its flow direction by means of the baffle plates. As a result, the density of the moving bed formed by the moving bed forming unit is made uniform. Therefore, the stock oil and the catalyst can be mixed more effectively.

Effects of the Invention

The present invention can provide a mixing device capable of effectively mixing stock oil with a catalyst promptly and evenly, while increasing the amount of throughput.

Figure 1:
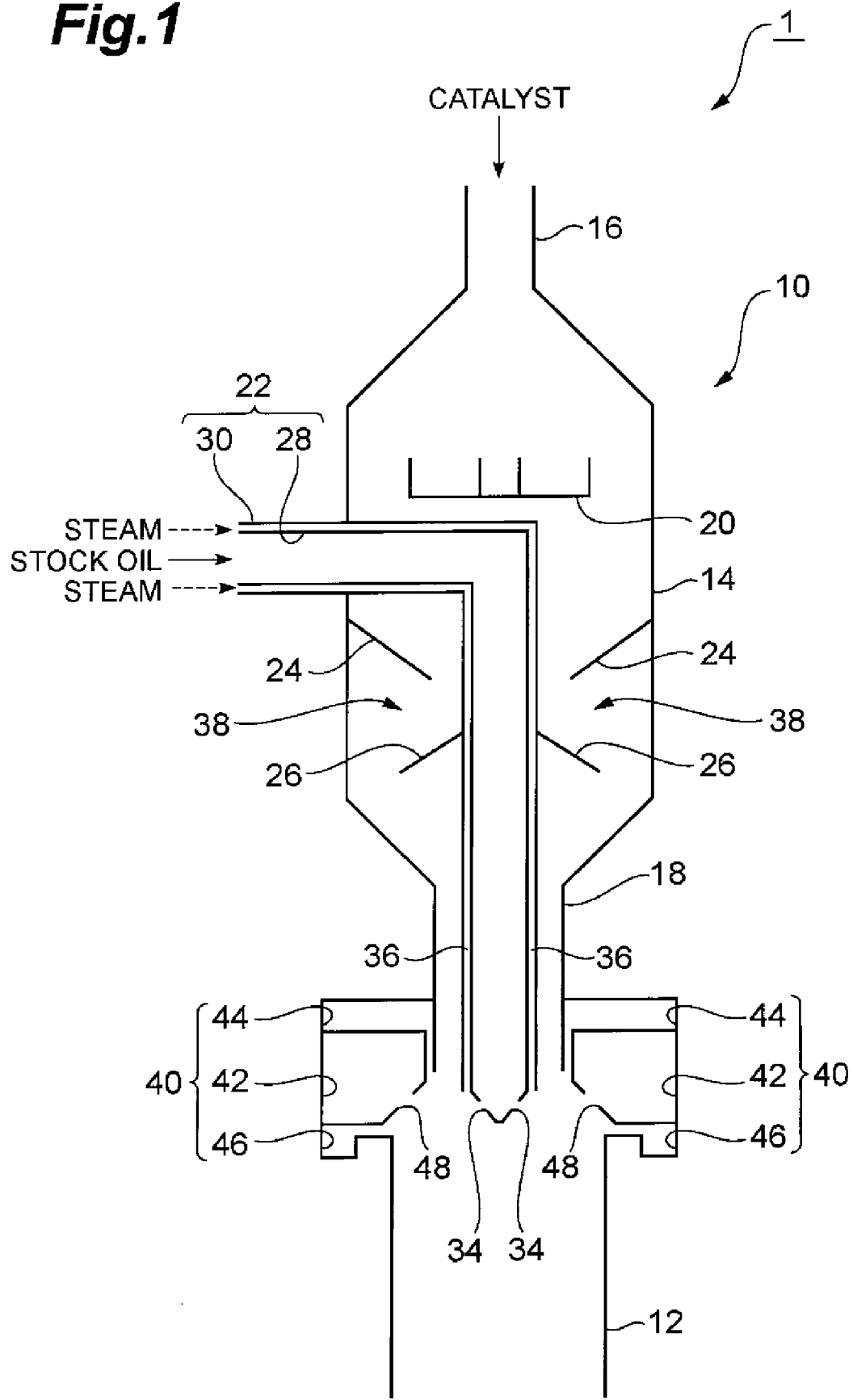
FIG. 1 is a longitudinal sectional view schematically showing a mixing device according to a first embodiment.

EXPLANATION OF REFERENCE NUMERALS 1, 2, 3 . . . Mixing device
10 . . . Moving bed forming unit
12 . . . Reaction tube
14 . . . Main body
22, 222 . . . Internal stock oil supply part
24, 26 . . . Baffle plates
28 . . . Stock oil transfer tube
30 . . . Steam transfer tube
32 . . . Moving bed
34, 234 . . . Internal stock oil injection nozzle
36, 50, 52, 264 . . . Gap (heat insulating means)
38 . . . Meander path
40, 240, 340 . . . External stock oil supply part
42 . . . Stock oil supply chamber
44 . . . Upper steam chamber
46 . . . Lower steam chamber
48, 248 . . . External stock oil injection nozzle

BEST MODE FOR CARRYING OUT THE INVENTION

Preferred embodiments of the present invention are now described with reference to the drawings. In the explanation, the same constituents or those having the same functions will be referred to with the same numerals or letters while omitting their overlapping descriptions.

First Embodiment

Figure 2:
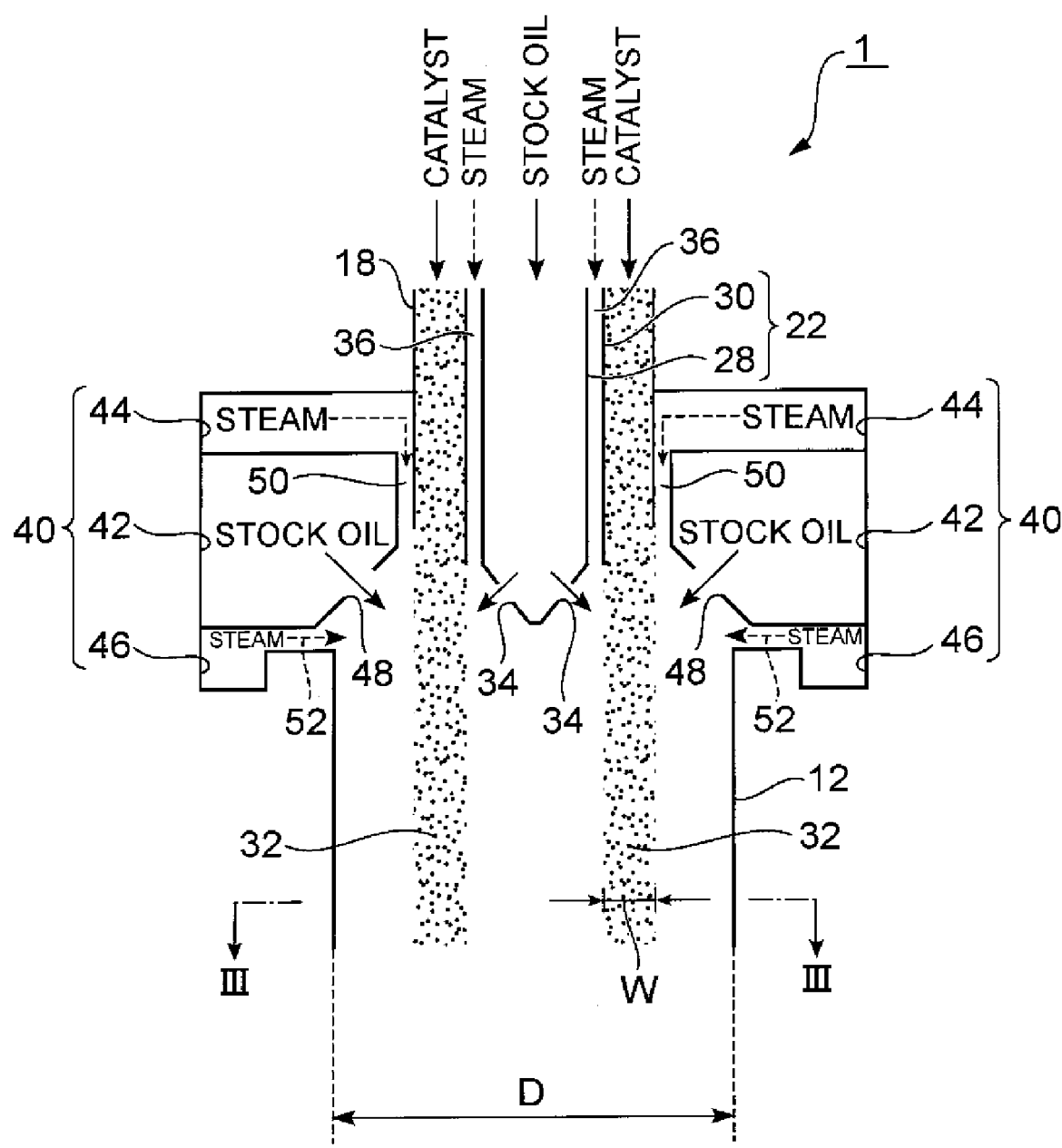
FIG. 2 is a partial enlarged diagram of FIG. 1 showing an internal stock oil supply part and an external stock oil supply part.
Figure 3:
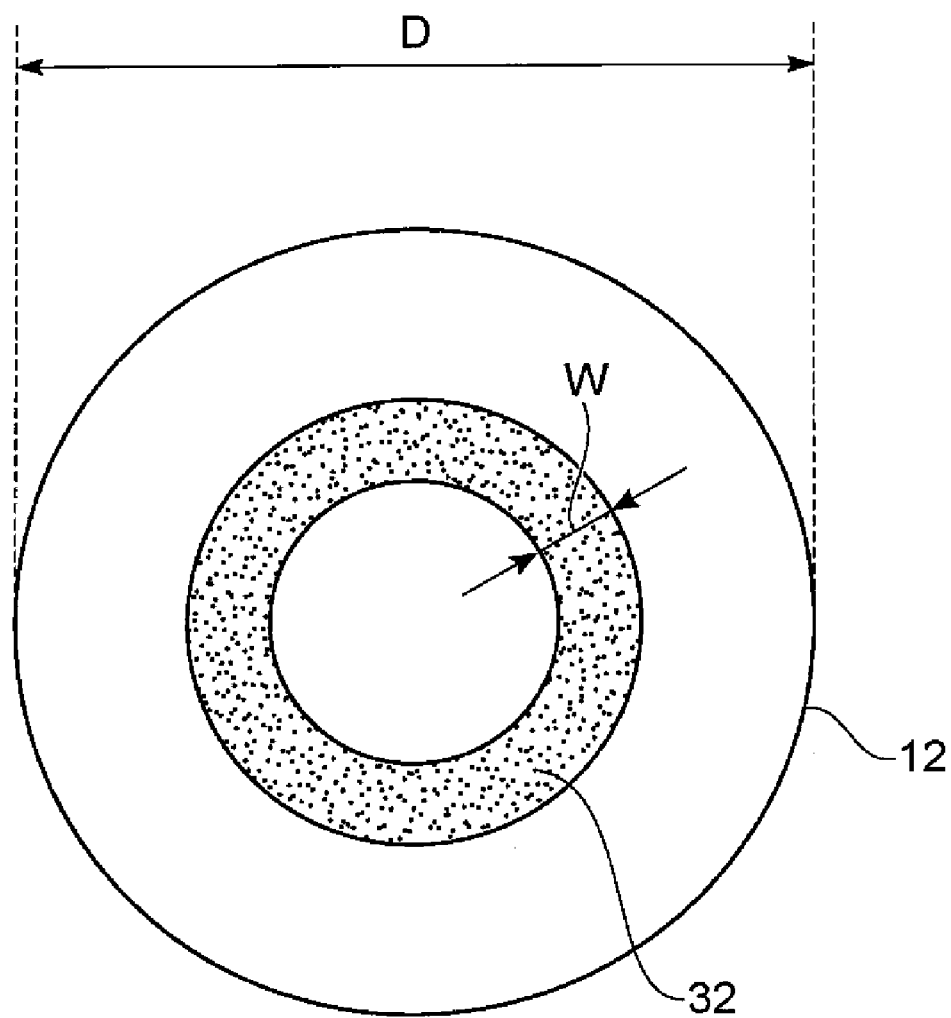
FIG. 3 is a cross-sectional view taken along III-III of FIG. 2.

The configuration of a mixing device 1 according to the first embodiment is described with reference to FIGS. 1 to 3. FIG. 1 is a longitudinal sectional view schematically showing the mixing device according to the first embodiment. FIG. 2 is a partial enlarged diagram of FIG. 1 showing an internal stock oil supply part and an external stock oil supply part. FIG. 3 is a cross-sectional view taken along III-III of FIG. 2.

The mixing device 1 is for mixing stock oil, such as heavy oil, with a particulate catalyst. The mixing device 1 has a moving bed forming unit 10 and a reaction tube 12, as shown in FIG. 1. Examples of the catalyst used in the mixing device 1 include a silica-alumina catalyst particle having a solid particle size of 1 μm to 500 μm and heated to 300° C. or more (preferably 450° C. to 700° C.).

The moving bed forming unit 10 has a cylindrical main body 14. An upper end part of the main body 14 is tapered upward, and the upper end of the main body 14 is provided with an inlet tube 16 for inputting the catalyst into the moving bed forming unit 10. Therefore, the catalyst that is input through the inlet tube 16 continuously falls from the top to the bottom of the moving bed forming unit 10. A lower end part of the main body 14 is tapered downward, and the lower end of the main body 14 is provided with an outlet tube 18 for discharging the catalyst to the reaction tube 12. The inside of the main body 14 is provided with a catching tray 20, internal stock oil supply part 22, and baffle plates 24, 26.

The catching tray 20, disposed in a position facing the inlet tube 16 in the upper part within the main body 14, receives the catalyst that is input from the inlet tube 16.

The internal stock oil supply pat 22 has a stock oil transfer tube 28 and a steam transfer tube 30 to form a double-tube structure. The internal stock oil supply part 22 is disposed coaxially with the outlet tube 18, and a leading end part of the internal stock oil supply part 22 is positioned slightly below a lower end of the outlet tube 18. The internal stock oil supply part 22 extends along a vertical direction, up to near the catching tray 20, bends at a right angle and further penetrates and extends through a side wall in a horizontal direction. Therefore, a cylindrical moving bed 32 is formed as the catalyst continuously falls from the top to the bottom between the internal stock oil supply part 22 and the outlet tube 18, as shown in FIGS. 2 and 3.

As shown in FIGS. 1 and 2, the stock oil transfer tube 28 is in the shape of a circular cone with a leading end thereof tapered downward. A circular conical surface of the stock oil transfer tube 28 is provided with an internal stock oil injection nozzle 34 that faces an inner surface of the moving bed 32. The stock oil that is supplied from a pump or other stock oil supply device (not shown) connected with a base end of the stock oil transfer tube 28 through the stock oil transfer tube 28 is injected from this internal stock oil injection nozzle 34 over the entire area in a circumferential direction of the inner surface of the moving bed 32. The spray angle of the internal stock oil injection nozzle 34 is set at 45° downward relative a horizontal surface in the first embodiment, but it is preferably 15° to 75° so that when the injected stock oil collies with the moving bed 32, the stock oil can be refined by the shock from the collision. Note that the number of the internal stock oil injection nozzles 34 may be set to any number as long the stock oil can be injected over the entire area in the circumferential direction of the inner surface of the moving bed 32.

The steam transfer tube 30 covering the stock oil transfer tube 28 is disposed coaxially with the stock oil transfer tube 28. Steam that is introduced from a base end side of the steam transfer tube 30 is transferred to a gap 36 formed between the stock oil transfer tube 28 and the steam transfer tube 30, in order to prevent caulking of the stock oil caused by the heat conduction from the catalyst.

The baffle plate 24 and the baffle plate 26 are in the shape of a circular ring. An outer circumferential part of the baffle plate 24 is provided on an inner wall of the main body 14, and the baffle plate 24 is inclined downward, with the outer circumferential part positioned higher than an inner circumferential part. The inner circumferential part of the baffle plate 24 is separated from the internal stock oil supply part 22 (steam transfer tube 30) so that an opening is formed between the inner circumferential part of the baffle plate 24 and the internal stock oil supply part 22 (steam transfer tube 30). An inner circumferential part of the baffle plate 26 is fixed to an outer wall of the internal stock oil supply part 22 (steam transfer tube 30), and the baffle plate 26 is inclined downward, with the inner circumferential part positioned higher than an outer circumferential part. The outer circumferential part of the baffle plate 26 is separated from the main body 14 so that an opening is formed between the outer circumferential part of the baffle plate 26 and the main body 14. Therefore, the baffle plate 24 and the baffle plate 26 configure a meander path 38 for causing the catalyst to meander and fall.

The reaction tube 12, a circular tube extending in the vertical direction, is connected with the moving bed forming unit 10 via an external stock oil supply part 40 provided in an upper end part of the reaction tube 12. A reforming reaction of the stock oil that comes into contact with the catalyst is performed in the reaction tube 12.

The external stock oil supply part 40 is connected with a lower end part of the outlet tube 18 and has disposed therein a stock oil supply chamber 42, upper steam chamber 44, and lower steam chamber 46 to surround the outlet tube 18. The external stock oil supply chamber 42, upper steam chamber 44, and lower steam chamber 46 are in the shape of a ring.

The external stock oil supply chamber 42 has an inclined surface facing an outer surface of the moving bed 32. The inclined surface of the external stock oil supply chamber 42 is provided with an external stock oil injection nozzle 48 that also faces the outer surface of the moving bed 32. The stock oil that is supplied from the external stock oil supply chamber 42 is injected from the external stock oil injection nozzle 48 over the entire surface in the circumferential direction of the outer surface of the moving bed 32. In the first embodiment the external stock oil injection nozzle 48 injects the stock oil by means of a so-called hydraulic atomizing system that uses the spray effect obtained by increasing the nozzle linear velocity of the external stock oil injection nozzle 48, and therefore atomizing steam serving as an atomizing medium is not used. The spray angle of the external stock oil injection nozzle 48 is set at 45° downward relative to the horizontal surface in the first embodiment, but it is preferably 15° to 75° so that when the injected stock oil collies with the moving bed 32, the stock oil can be refined by the shock from the collision. Note that the number of the external stock oil injection nozzles 48 may be set to any number as long the stock oil can be injected over the entire area in the circumferential direction of the outer surface of the moving bed 32. However, it is preferred that the injection ratio of the stock oil injected from the external stock oil injection nozzle 48 and the above-mentioned internal stock oil injection nozzle 34 be 1:1 to 3:1.

The upper steam chamber 44 is disposed in an upper part of the external stock oil supply chamber 42. The upper steam chamber 44 is also communicated to the reaction tube 12 via a gap 50 formed between the external stock oil supply chamber 42 and the outlet tube 18. Therefore, the steam flows out of the upper steam chamber 44 into the reaction tube 12 via the gap 50 to insulate the external stock oil supply chamber 42 and outlet tube 18, whereby the caulking of the stock oil caused by the heat conduction from the catalyst can be prevented. The lower steam chamber 46, on the other hand, is disposed in a lower part of the external stock oil supply chamber 42. The lower steam chamber 46 is also communicated to the reaction tube 12 via a gap 52 formed in the lower part of the external stock oil supply chamber 42. Therefore, the steam flows out of the lower steam chamber 46 into the reaction tube 12 via the gap 52 to insulate the lower part of the external stock oil supply chamber 42.

In the mixing device 1 with the above-described structure, the catalyst is input by the inlet tube 16, gradually accumulates on the catching tray 20, and eventually spills out (overflows) of the catching tray 20. The catalyst that spills out of the catching tray 20 falls onto the baffle plate 24, moves from the outer circumferential part to inner circumferential part of the baffle plate 24, falls onto the baffle plate 26 from the opening formed between the inner circumferential part of the baffle plate 24 and the internal stock oil supply part 22 (steam transfer tube 30), thereafter moves from the inner circumferential part to outer circumferential part of the baffle plate 26, and then falls onto the outlet tube 18 from the opening formed between the outer circumferential part of the baffle plate 26 and the inner wall of the main body 14. As a result, the catalyst that passes through the meandering path 38 configured by the baffle plates 24, 26 is dispersed evenly in the circumferential direction of the main body 14 while changing its flow direction, whereby the density in the circumferential direction is made uniform. The catalyst that falls onto the outlet tube 18 then forms the cylindrical moving bed 32 when passing through between the outlet tube 18 and the internal stock oil supply part 22, and is discharged from the outlet tube 18 to the reaction tube 12. Thereafter, the stock oil is injected from the internal stock oil injection nozzle 34 and the external stock oil injection nozzle 48 to the inner circumferential surface and outer circumferential surface of the moving bed 32, whereby the catalyst is mixed with the stock oil.

Here, in the case of mixing the catalyst with the stock oil in the mixing device 1, when a mass flow per unit area of the moving bed is $Q$ [kg/m$^2$s], the difference between an outer diameter and an inner diameter of the moving bed $W$ [m], an inner diameter of the reaction tube $D$ [m], a linear velocity of a horizontal component of the stock oil at a jet orifice of the internal stock oil injection nozzle $u1$ [m/s], the stock oil being supplied from the internal stock oil supply part, and a linear velocity of a horizontal component of the stock oil at a jet orifice of the external stock oil injection nozzle $u2$ [m/s], the stock oil being supplied from the external stock oil supply part, $$8.0 \geq Q \times (W/D)/(u1+u2),$$

$Q$=300 to 2000 [kg/m$^2$s],
$W/D$=0.2 to 0.5,
$u1$=5 to 300 [m/s], and
$u2$=5 to 300 [m/s]

are satisfied. When these relations, especially the above-mentioned inequality, are not satisfied, the catalyst and the stock oil cannot be mixed promptly and evenly well due to low spray velocity of the stock oil and weak penetration into the moving bed. Therefore, the catalyst cannot be used effectively, whereby reduction in a reaction inversion rate, increase in a side reaction due to thermal decomposition, and insufficient evaporation of high-boiling components occur, causing a phenomenon such as increase in the coke yield. Although $Q \times (W/D)/(u1+u2)$ needs to be equal to or lower than 8.0, but 5.0 or lower or 3.0 or lower is even more preferred.

As described above, in the first embodiment, all of the above-mentioned relations are satisfied when a mass flow per unit area of the moving bed is $Q$ [kg/m$^2$s], the difference between the outer diameter and the inner diameter of the moving bed $W$ [m], the inner diameter of the reaction tube $D$ [m], the linear velocity of the horizontal component of the stock oil at the jet orifice of the internal stock oil injection nozzle $u1$ [m/s], the stock oil being supplied from the internal stock oil supply part, and the linear velocity of the horizontal component of the stock oil at the jet orifice of the external stock oil injection nozzle $u2$ [m/s], the stock oil being supplied from the external stock oil supply part. Then, the stock oil is injected from the internal stock oil injection nozzle 34 and the external stock oil injection nozzle 48 to the moving bed 32. Consequently, the stock oil and the catalyst can be mixed promptly and evenly in an effective manner while increasing the amount of throughput of the mixing device 1.

Moreover, in the first embodiment, the spray angles of the internal stock oil injection nozzle 34 and the external stock oil injection nozzle 48 are set at 15° to 75° downward relative to the horizontal surface. Therefore, when the stock oil injected from the internal stock oil injection nozzle 34 and the external stock oil injection nozzle 48 collides with the moving bed 32, the stock oil can be refined by the collision. As a result, the stock oil and the catalyst can be mixed more effectively.

In addition, in the first embodiment, the temperature of the catalyst is set at 300° C. or higher, and the internal stock oil supply part 22 and the external stock oil supply part 40 are each provided with the gaps 36, 50, 52 where the steam insulates the heat generated from the catalyst. Therefore, the caulking of the stock oil caused by the heat conduction from the catalyst can be prevented.

Furthermore, in the first embodiment, because the baffle plates 24, 26 are provided on the inside of the moving bed forming unit 10, the catalyst can be dispersed evenly in the horizontal direction while changing its flow direction, whereby the density of the moving bed 32 formed by the moving bed forming unit 10 can be made uniform. As a result, the stock oil and the catalyst can be mixed even more effectively.

Second Embodiment

Figure 4:
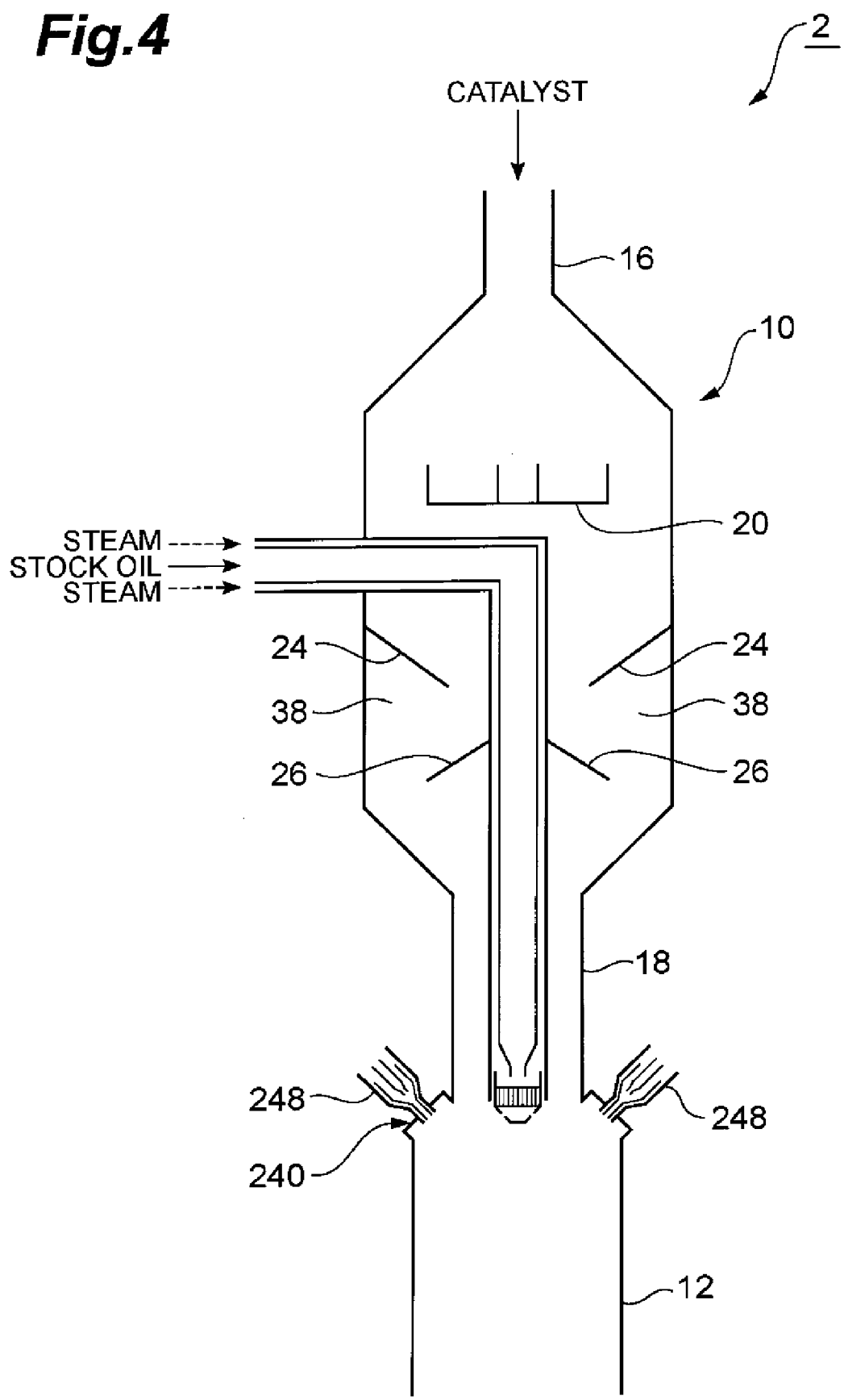
FIG. 4 is a longitudinal sectional view schematically showing a mixing device according to a second embodiment.
Figure 5:
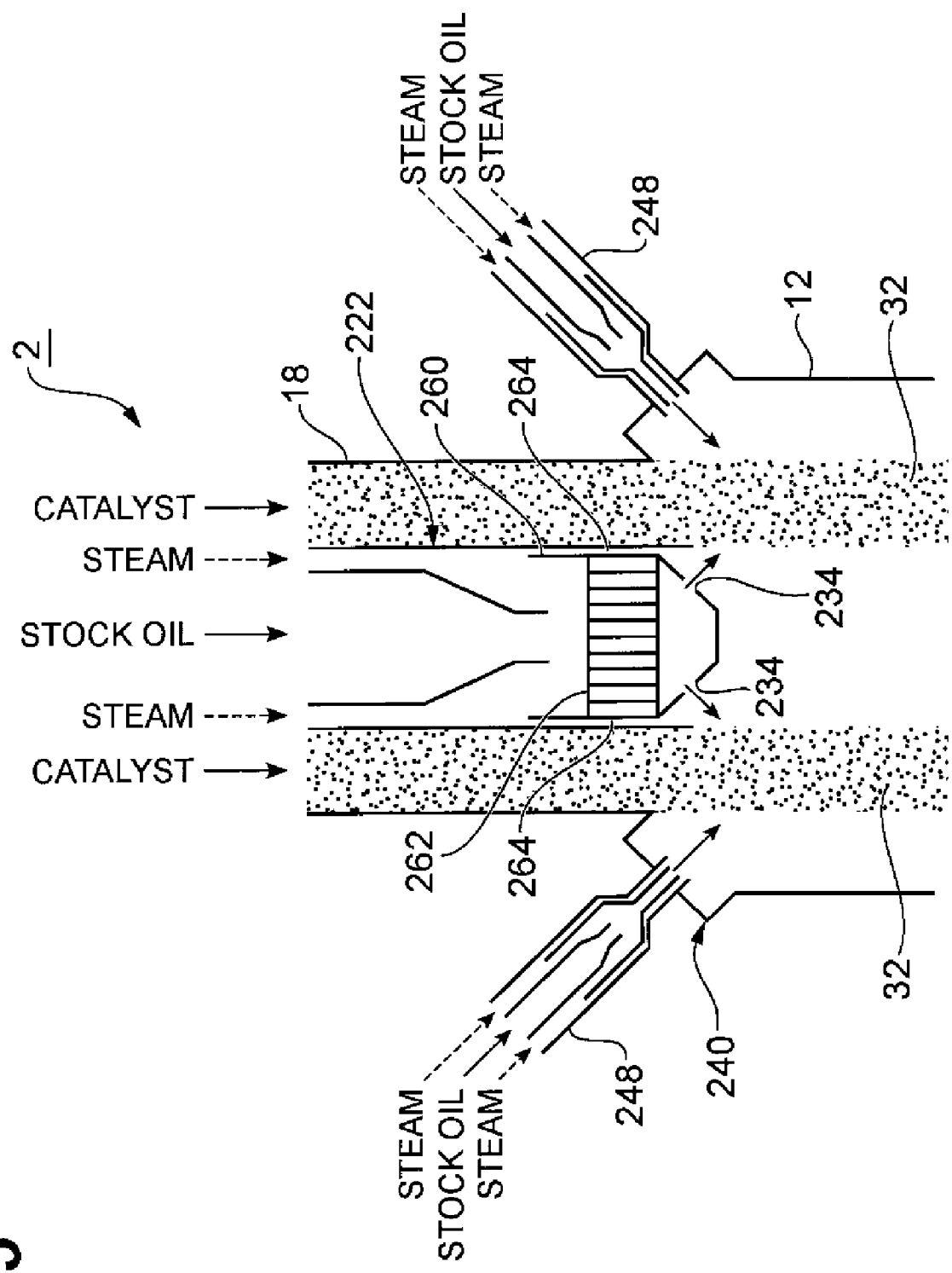
FIG. 5 is a partial enlarged diagram of FIG. 4 showing an internal stock oil supply part and an external stock oil supply part.

Next, the configuration of a mixing device 2 according to the second embodiment is described with reference to FIGS. 4 and 5. FIG. 4 is a longitudinal sectional view schematically showing the mixing device 2 according to the second embodiment. FIG. 5 is a partial enlarged diagram of FIG. 4 showing an internal stock oil supply part and an external stock oil supply part. The mixing device 2 according to the second embodiment is different from the mixing device 1 according to the first embodiment, in terms of an internal stock oil supply part 222 and an external stock oil supply part 240.

The internal stock oil supply part 222 is for injecting the stock oil using a spray medium (e.g. gas, atomizing steam) and is in the form of a so-called internal mixing system in which the stock oil flows the center of the internal stock oil supply part 222 and the atomizing steam flows the outside of the stock oil, as shown in FIG. 5. Therefore, the internal stock oil supply part 222 has a mixing chamber 260 at its leading end, as shown in FIGS. 4 and 5. The mixing chamber 260 is in the shape of a circular cone with a leading end thereof tapered downward. A circular conical surface of the mixing chamber 260 is provided with an internal stock oil injection nozzle 234 that faces the inner surface of the moving bed 32. The mixing chamber 260 is further provided with an atomizer 262 to improve the spray effect. Note in the internal stock oil supply part 222 that some of the atomizing steam is caused to flow to a leading end through a gap 264 provided on an outer circumference of the mixing chamber 260, in order to prevent caulking of the stock oil caused by the heat conduction from the catalyst.

The external stock oil supply part 240 has a plurality of external stock oil injection nozzles 248 that supply the stock oil independently. The plurality of external stock oil injection nozzles 248 are disposed at predetermined intervals in a circumferential direction of an upper part of the reaction tube 12. Each of the external stock oil injection nozzles 248 injects the stock oil using a spray medium (e.g. gas, atomizing steam) and is in the form of a so-called internal mixing system in which the stock oil flows the center of the external stock oil supply nozzle 248 and the atomizing steam flows the outside of the stock oil, as shown in FIG. 5.

The mixing device 2 according to the second embodiment described above also achieves the same operational effects as those of the mixing device 1 according to the first embodiment.

Third Embodiment

Figure 6:
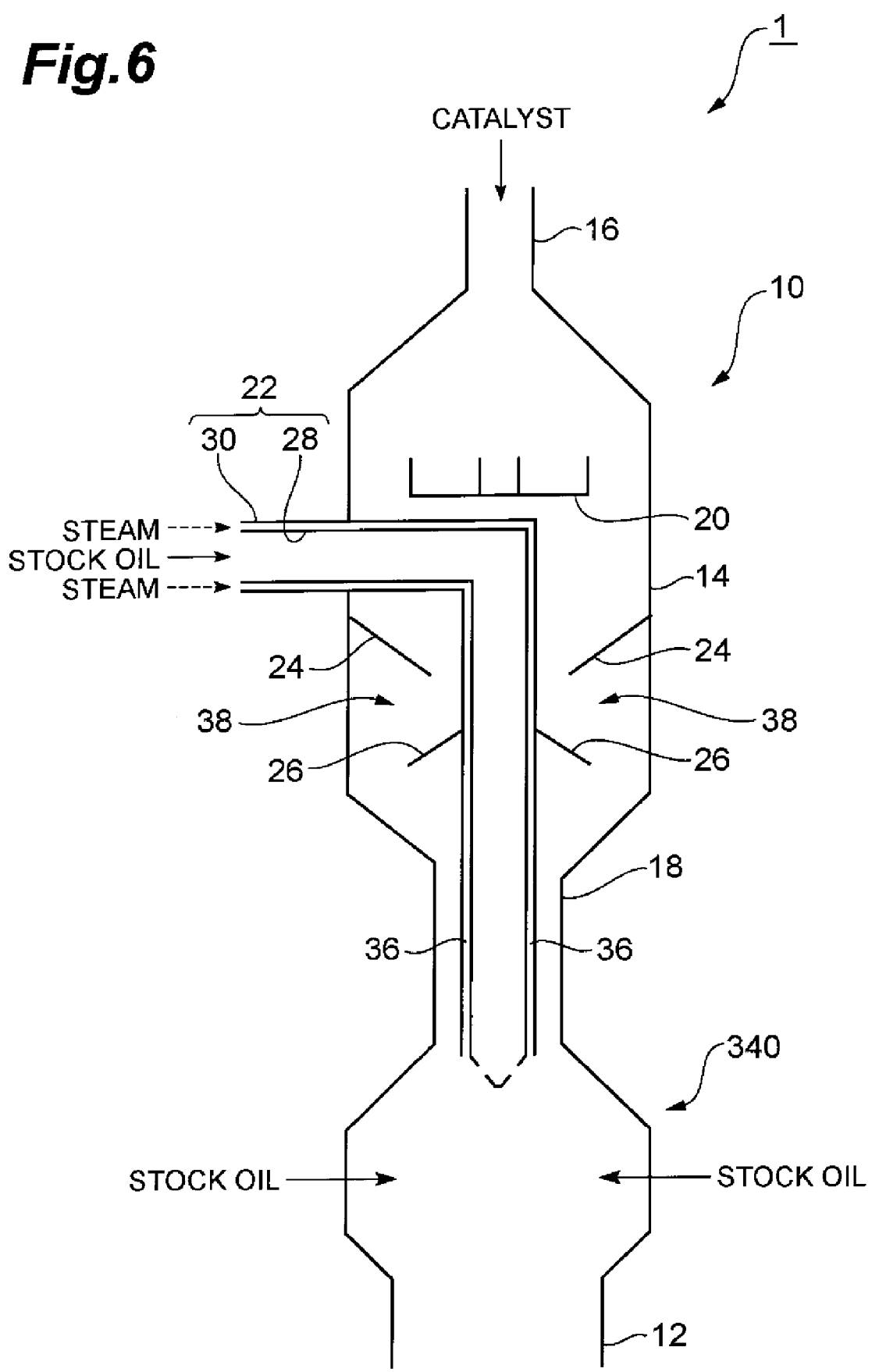
FIG. 6 is a longitudinal sectional view schematically showing a mixing device according to a third embodiment.

Next, the configuration of a mixing device 3 according to the third embodiment is described with reference to FIG. 6. FIG. 6 is a longitudinal sectional view schematically showing the mixing device according to the third embodiment. The mixing device 3 is different from the mixing device 1 according to the first embodiment, in terms of an external stock oil supply part 340.

The external stock oil supply part 340 is in the shape of a cylinder having the same diameter as the main body 14 of the moving bed forming unit 10. An outer circumference of the external stock oil supply part 340 is provided with an external stock oil injection nozzle, not shown. The spray angle of this external stock oil injection nozzle is set parallel to the horizontal direction.

The mixing device 3 according to the third embodiment described above also achieves the same operational effects as those of the mixing device 1 according to the first embodiment.

Although the preferred embodiments of the present invention are described above in detail, the present invention is not limited to these above-described embodiments. For example, instead of using the baffle plates 24, 26, a fluidized bed of the catalyst may be formed using a fluidized bed furnace, to make the density of the catalyst uniform.

The shape of the main body 14 of the moving bed forming unit 10 may be not only a cylinder but also a square column, hexagonal column or polygonal column.

In addition, the diameter of the outlet tube 18 can be designed arbitrarily in accordance with the amount of catalyst supplied. For example, the diameter of the outlet tube 18 may be smaller than the diameter of the reaction tube 12. It may be larger than the diameter of the reaction tube 12 in the case where the amount of catalyst supplied is extremely large.

Moreover, gas may be supplied along with the catalyst from the inlet tube 16, in order to compensate the pressure for overcoming the pressure loss of the main body 14, by supplying the gas. This is because although the catalyst passes through the outlet tube 18 smoothly when dropping a small amount of catalyst onto the outlet tube 18 by means of the gravity action without supplying the gas, pressure loss occurs in the outlet tube 18 when the amount of catalyst to be input is large, which fills up the main body 14 with the catalyst. By supplying gas to the main body 14, the uniformization of the density of the catalyst can be accelerated.

The number of the baffle plates 24, 26 can be set to any number, as long as the catalyst can be disposed evenly.

The baffle plates 24, 26 may be formed into any shape, as long the flow direction of the catalyst is changed and the catalyst can be disposed evenly in the circumferential direction of the main body 14.

Furthermore, although steam is used in the first to third embodiments in order to prevent the caulking of the stock oil caused by the heat conduction from the catalyst, fluid such as air, or a heat insulating material may be used.

Example 1

The present invention is described hereinafter in more detail based on Example 1 and Comparative Example 1, but the present invention is not limited to the following examples.

Example 1

The catalyst and the stock oil were mixed using the mixing device 1 shown in FIG. 1. The conditions are shown in Table 1.

TABLE 1

| | |
|---|---|
| Diameter of main body 14 | 0.146 m |
| Length of main body 14 | 0.220 m |
| Diameter of outlet tube 18 | 0.094 m |
| Length of outlet tube 18 | 0.094 m |
| Diameter of internal stock oil supply part 22 (steam transfer tube 30) | 0.047 m |
| Diameter of reaction tube 12 | 0.115 m |
| Linear velocity of internal stock oil injection nozzle 34 | 8.3 m/s |
| Number of internal stock oil injection nozzles 34 | 1 |
| Linear velocity of external stock oil injection nozzle 48 | 8.3 m/s |
| Number of external stock oil injection nozzles 48 | 4 |
| Spray angle of internal stock oil injection nozzle 34 and external stock oil injection nozzle 48 | 45° |

A catalyst that is used in a fluid catalytic cracking unit for producing gasoline out of heavy oil was used as the catalyst. The average particle size of this catalyst was 63 μm, and the bulk specific gravity was 0.85 g/cm³. The amount of catalyst supplied was set at 71.0 kg/min, the mass flow Q per unit area of the moving bed 32 in the outlet tube 18 at 228 kg/m²·sec, and the difference W between the outer diameter and the inner diameter of the moving bed 32 at 0.047 m. In addition, the amount of stock oil supplied in the internal stock oil supply part 22 was set at 60 kg/h, a total of four amounts of stock oil supplied in the external stock oil supply part 40 at 120 kg/h, the velocity u1 of the horizontal component of the stock oil at the jet orifice of the internal stock oil injection nozzle 34 at 5.87 m/sec, and the velocity u2 of the horizontal component of the stock oil at the jet orifice of the external stock oil injection nozzle 48 at 5.87 m/sec. Q×(W/D)/(u1+u2) was equal to 7.9. The reaction results obtained here are shown in Table 2.

Comparative Example 1

The catalyst and the stock oil were mixed in the same manner as in Example 1, except that the spray angle of the internal stock oil injection nozzle 34 and external stock oil injection nozzle 48 was set at 30°. As a result, the velocity u1 of the horizontal component of the stock oil at the jet orifice of the internal stock oil injection nozzle 34 was changed to 4.15 m/sec, and the velocity u2 of the horizontal component of the stock oil at the jet orifice of the external stock oil injection nozzle 48 to 4.15 m/sec. Q×(W/D)/(u1+u2) was equal to 11.2. The reaction results obtained here are shown in Table 2.

(Evaluation Result)

As a result of mixing the catalyst and the stock oil promptly and evenly in Example 1, a high decomposition rate was achieved, while preventing a significant increase in by-product gas (H2-C2) or coke yield.

In Comparison Example 1, on the other hand, the catalyst was not used effectively because the prompt and even mixing scarcely occurred. As a result, the decomposition rate has decreased and, on the contrary, thermal decomposition was accelerated and by-product gas was increased. Moreover, coke yield has also increased because gasification of high-boiling compounds of the stock oil was not accelerated.

TABLE 2

| | | Example | Comparative Example |
|---|---|---|---|
| Temperature of reactor outlet | °C. | 600 | 600 |
| Cat/Oil | Wt/wt | 25 | 25 |
| Decomposition rate | Mass % | 81.54 | 73.62 |
| Yield mass % | C2= | 1.75 | 2.36 |
| | C3= | 10.77 | 7.52 |
| | C4= | 13.63 | 10.63 |
| | H2—C2 | 5.52 | 7.82 |
| | C3-C4 | 30.2 | 24.32 |
| | CCG | 36.62 | 30.15 |
| | LCO | 10.63 | 12.35 |
| | HCO+ | 7.82 | 14.03 |
| | Coke | 9.21 | 11.33 |
| | Total | 100 | 100 |

The invention claimed is:

1. A mixing device for mixing stock oil with a particulate catalyst, comprising:
   a moving bed forming unit that forms a cylindrical moving bed by continuously dropping the catalyst from the top to the bottom while distributing the catalyst in an annular form;
   a reaction tube that surrounds the moving bed formed by the moving bed forming unit;
   an internal stock oil supply part that has an internal stock oil injection nozzle for supplying the stock oil over the entire area in a circumferential direction of an inner surface of the moving bed formed by the moving bed forming unit; and
   an external stock oil supply part having an external stock oil injection nozzle for supplying the stock oil over the entire area in a circumferential direction of an outer surface of the moving bed formed by the moving bed forming device,
   wherein when a mass flow per unit area of the moving bed is Q [kg/m²s], the difference between an outer diameter and an inner diameter of the moving bed W [m], an inner diameter of the reaction tube D [m], a linear velocity of a horizontal component of the stock oil at a jet orifice of the internal stock oil injection nozzle u1 [m/s], the stock oil being supplied from the internal stock oil supply part, and a linear velocity of a horizontal component of the stock oil at a jet orifice of the external stock oil injection nozzle u2 [m/s], the stock oil being supplied from the external stock oil supply part, $8.0 \geq Q \times (W/D)/(u1+u2)$, Q=300 to 2000 [kg/m²s],
   W/D=0.2 to 0.5,
   u1=5 to 300 [m/s], and
   u2=5 to 300 [m/s] are satisfied.

2. The mixing device according to claim 1, wherein the internal stock oil injection nozzle and the external stock oil injection nozzle inject the stock oil downward at 15° to 75° relative to a horizontal surface of each nozzle.

3. The mixing device according to claim 1, wherein the temperature of the catalyst is at least 300° C., and the internal stock oil supply part and the external stock oil supply part are each provided with heat insulating means for insulating heat generated from the catalyst.

4. The mixing device according to claim 1, wherein the inside of the moving bed forming unit is provided with a plurality of baffle plates for evenly dispersing the catalyst in a horizontal direction while changing the direction of the catalyst that is continuously dropped from the top to the bottom.

* * * * *